United States Patent
Wu et al.

(10) Patent No.: US 10,210,372 B2
(45) Date of Patent: Feb. 19, 2019

(54) FINGERPRINT SENSOR AND SENSING METHOD THEREOF

(71) Applicant: Egis Technology Inc., Taipei (TW)

(72) Inventors: Hsu-Heng Wu, Taipei (TW); Gong-Yi Lin, Taipei (TW)

(73) Assignee: Egis Technology Inc., Taipei (TW)

( * ) Notice: Subject to any disclaimer, the term of this patent is extended or adjusted under 35 U.S.C. 154(b) by 156 days.

(21) Appl. No.: 14/645,266

(22) Filed: Mar. 11, 2015

(65) Prior Publication Data
US 2016/0092713 A1 Mar. 31, 2016

(30) Foreign Application Priority Data
Sep. 29, 2014 (CN) .......................... 2014 1 0514461

(51) Int. Cl.
*G06K 9/00* (2006.01)
(52) U.S. Cl.
CPC ....... *G06K 9/0002* (2013.01); *G06K 9/00087* (2013.01)
(58) Field of Classification Search
None
See application file for complete search history.

(56) References Cited

U.S. PATENT DOCUMENTS

| | | | |
|---|---|---|---|
| 4,429,413 A * | 1/1984 | Edwards | A61B 5/1172 257/E27.006 |
| 6,633,656 B1 * | 10/2003 | Picard | G01K 17/003 340/5.53 |
| 2004/0252867 A1 * | 12/2004 | Lan | G06K 9/0004 382/124 |
| 2005/0210988 A1 * | 9/2005 | Amano | G06K 9/0002 73/704 |
| 2006/0153431 A1 * | 7/2006 | Ando | G06K 9/00067 382/124 |
| 2008/0116904 A1 * | 5/2008 | Reynolds | G06F 3/0416 324/678 |
| 2008/0223925 A1 * | 9/2008 | Saito | G06Q 20/341 235/380 |
| 2010/0079397 A1 * | 4/2010 | Yang | G06F 3/0416 345/173 |
| 2010/0113952 A1 * | 5/2010 | Raguin | G06K 9/0012 600/509 |
| 2011/0068893 A1 * | 3/2011 | Lahiri | G06Q 30/06 340/5.8 |

(Continued)

*Primary Examiner* — Iman K Kholdebarin
(74) *Attorney, Agent, or Firm* — JCIPRNET

(57) ABSTRACT

A fingerprint sensor for sensing fingerprint information of a finger is provided. The fingerprint sensor includes a sensing array including a plurality of sensing units, an insulating surface disposed on the sensing array, a readout module, a memory array including a plurality of memory units respectively corresponding to the sensing units, and a processor. Each of the sensing units includes a sensing electrode. The readout module reads a sensing voltage of the sensing electrode of each of the sensing units, and provides a sensing output according to the sensing voltage. Each of the memory units is adjacent to the corresponding sensing unit and stores information of the corresponding sensing unit. The processor obtains the fingerprint information of the finger according to the sensing output and the information stored in the memory unit.

20 Claims, 5 Drawing Sheets

(56) References Cited

U.S. PATENT DOCUMENTS

| | | | | |
|---|---|---|---|---|
| 2011/0100728 A1* | 5/2011 | Chen | G06F 3/044 | 178/18.06 |
| 2013/0162590 A1* | 6/2013 | Imai | G06F 3/044 | 345/174 |
| 2013/0271422 A1* | 10/2013 | Hotelling | G06F 3/044 | 345/174 |
| 2014/0071417 A1* | 3/2014 | Grespan | B32B 38/0008 | 355/67 |
| 2015/0189136 A1* | 7/2015 | Chung, II | G06K 9/00013 | 348/77 |
| 2015/0332080 A1* | 11/2015 | Du | G06K 9/00033 | 382/124 |
| 2015/0347812 A1* | 12/2015 | Lin | G06K 9/0012 | 382/124 |
| 2016/0026846 A1* | 1/2016 | Lin | G06K 9/0002 | 382/124 |
| 2016/0063301 A1* | 3/2016 | Wu | G06K 9/00033 | 382/124 |
| 2016/0092713 A1* | 3/2016 | Wu | G06K 9/0002 | 382/124 |
| 2016/0210496 A1* | 7/2016 | Lin | G06K 9/00053 | |
| 2016/0224819 A1* | 8/2016 | Kim | G06K 9/0004 | |
| 2016/0227142 A1* | 8/2016 | Lin | G06K 9/00013 | |
| 2016/0292489 A1* | 10/2016 | Lin | G06K 9/0002 | |

* cited by examiner

FINGERPRINT SENSOR AND SENSING METHOD THEREOF

CROSS REFERENCE TO RELATED APPLICATIONS

This Application claims priority of China Patent Application No. 201410514461.0, filed on Sep. 29, 2014, the entirety of which is incorporated by reference herein.

BACKGROUND OF THE INVENTION

Field of the Invention

The invention relates to a fingerprint sensor, and more particularly to a fingerprint sensor with memory units disposed within a sensing array.

Description of the Related Art

In recent years, biological identification technology has become increasingly mature, and different biological features can be used for identifying users. Since the recognition rate and accuracy of fingerprint identification technology are better than those of other biological feature identification technologies, fingerprint identification and verification is used extensively in various areas.

Fingerprint identification and verification technology detects a user's fingerprint image, captures fingerprint data from the fingerprint image, and saves the fingerprint data as a template. Thereafter, the user presses or slides the finger on or over the fingerprint sensor such that a fingerprint is captured and compared with a template. If the two match, then the user's identity is verified.

BRIEF SUMMARY OF THE INVENTION

Fingerprint sensors and sensing methods thereof are provided. An embodiment of a fingerprint sensor for sensing fingerprint information of a finger is provided. The fingerprint sensor comprises a sensing array comprising a plurality of sensing units, an insulating surface disposed on the sensing array, a readout module, a memory array comprising a plurality of memory units corresponding to the sensing units, respectively, and a processor. Each of the sensing units comprises a sensing electrode. The readout module reads a sensing voltage of the sensing electrode of each of the sensing units, and provides a sensing output according to the sensing voltage. Each of the memory units is adjacent to the corresponding sensing unit and stores information of the corresponding sensing unit. The processor obtains the fingerprint information of the finger according to the sensing output and the information stored in the memory unit.

Furthermore, an embodiment of a sensing method for a fingerprint sensor is provided. The fingerprint sensor comprises a sensing array comprising a plurality of sensing units, an insulating surface disposed on the sensing array, and a memory array comprising a plurality of memory units corresponding to the sensing units, respectively, wherein each of the memory units is adjacent to the corresponding sensing unit and stores information of the corresponding sensing unit. A sensing voltage of a sensing electrode of each of the sensing units is read, and a sensing output is provided according to the sensing voltage. Fingerprint information of a finger is obtained according to the sensing output and information stored in the memory unit.

Moreover, another embodiment of a fingerprint sensor for sensing fingerprint information of a finger is provided. The fingerprint sensor comprises a sensing array comprising a plurality of sensing units, an insulating surface disposed on the sensing array, a readout module, a memory array comprising a plurality of memory units, and a processor. Each of the sensing units comprises a sensing electrode for generating a sensing voltage. The readout module obtains the difference between the sensing voltages of two adjacent sensing units, and provides a sensing output according to the difference between the sensing voltages of the two adjacent sensing units. Each of the memory units is disposed between the two adjacent sensing units, and stores information corresponding to the two adjacent sensing units. The processor obtains the fingerprint information of the finger according to the sensing output and the information stored in the memory unit.

Furthermore, another embodiment of a sensing method for a fingerprint sensor is provided. The fingerprint sensor comprises a sensing array comprising a plurality of sensing units, an insulating surface disposed on the sensing array, and a memory array comprising a plurality of memory units, wherein each of the sensing units comprises a sensing electrode for generating a sensing voltage, and each of the memory units is disposed between two adjacent sensing units and stores information corresponding to the two adjacent sensing units. The difference between the sensing voltages of the two adjacent sensing units is obtained, and a sensing output is provided according to the difference between the sensing voltages of the two adjacent sensing units. Fingerprint information of a finger is obtained according to the sensing output and information stored in the memory unit.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

When a user presses or slides his finger on or over the fingerprint sensor, a fingerprint sensor will sense the ridges and the valleys of the fingerprint, and generate different capacitance values corresponding to the ridges and valleys. Next, voltage values corresponding to the capacitance values are obtained by using a charge-sharing technique, and the voltage value is input to an analog-to-digital converter (ADC) for converting the voltage value into a digital code. The digital code is provided to a processor for subsequent operation and fingerprint identification.

Figure 1:
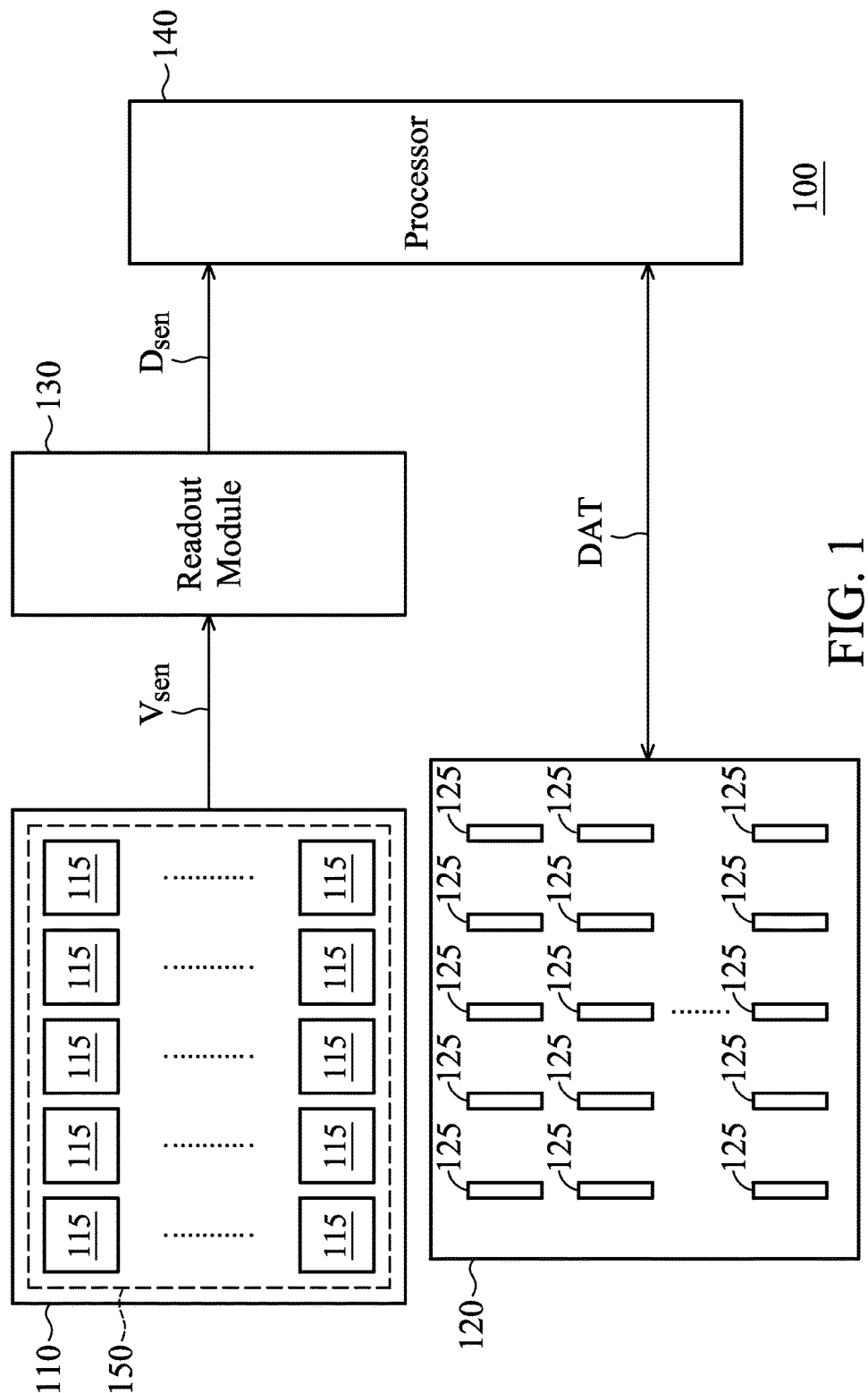
FIG. 1 shows a fingerprint sensor according to an embodiment of the invention.

FIG. 1 shows a fingerprint sensor 100 according to an embodiment of the invention. The fingerprint sensor 100 comprises a sensing array 110, a memory array 120, a readout module 130, a processor 140 and an insulating surface 150. In the embodiment, the sensing array 110, the memory array 120, the readout module 130 and the processor 140 are installed in a semiconductor substrate. The sensing array 110 is formed by a plurality of sensing units 115 arranged in a two-dimensional manner. The insulating surface 150 is disposed on the semiconductor substrate, and overlays the whole sensing units 115 of the sensing array 110. The memory array 120 comprises a plurality of memory units 125, wherein the memory units 125 are interlaced among the sensing units 115 in layout, and each memory unit 125 is adjacent to a corresponding sensing unit 115. The readout module 130 obtains a sensing voltage $V_{sen}$ of each sensing unit 115 from the sensing array 110, and according to the sensing voltage $V_{sen}$, provides a sensing output $D_{sen}$ corresponding to the sensing unit 115 to the processor 140. While obtaining the sensing output $D_{sen}$ of the sensing unit 115, the processor 140 also obtains data DAT corresponding to the sensing unit 115 from the memory array 120. Next, the processor 140 determines whether a finger of a user contacts the insulating surface 150 according to the sensing outputs $D_{sen}$ of the sensing units 115 and the corresponding data DAT, and further obtains fingerprint information of the finger, so as to determine that the sensing output $D_{sen}$ corresponds to a fingerprint ridge or a fingerprint valley of the finger. Thus, according to the sensing outputs $D_{sen}$ of all sensing units 115 and the corresponding data DAT, the processor 140 obtains the binary or gray-level fingerprint data for subsequent processes, for example, a fingerprint identification operation is performed by a fingerprint identification algorithm. In one embodiment, the data DAT stored in the memory unit 125 of the memory array 120 is an error value Err of the sensing unit 115 in the sensing array 110, wherein the error value Err represents the sensing voltage $V_{sen}$ of the sensing unit 115 that is obtained when no object contacts the insulating surface 150. Thus, the processor 140 can obtain the fingerprint information of the finger according to the current sensing voltages $V_{sen}$ and the error values Err stored in the memory array 120. For example, the corrected sensing voltage is obtained by subtracting the error value Err from the current sensing voltage $V_{sen}$. Therefore, the fingerprint sensor 100 can perform a self-calibration procedure according to the error values Err. Moreover, in another embodiment, the processor 140 can store the fingerprint information sensed by each sensing unit 115 into the corresponding memory unit 125 of the memory array 120.

Figure 2:
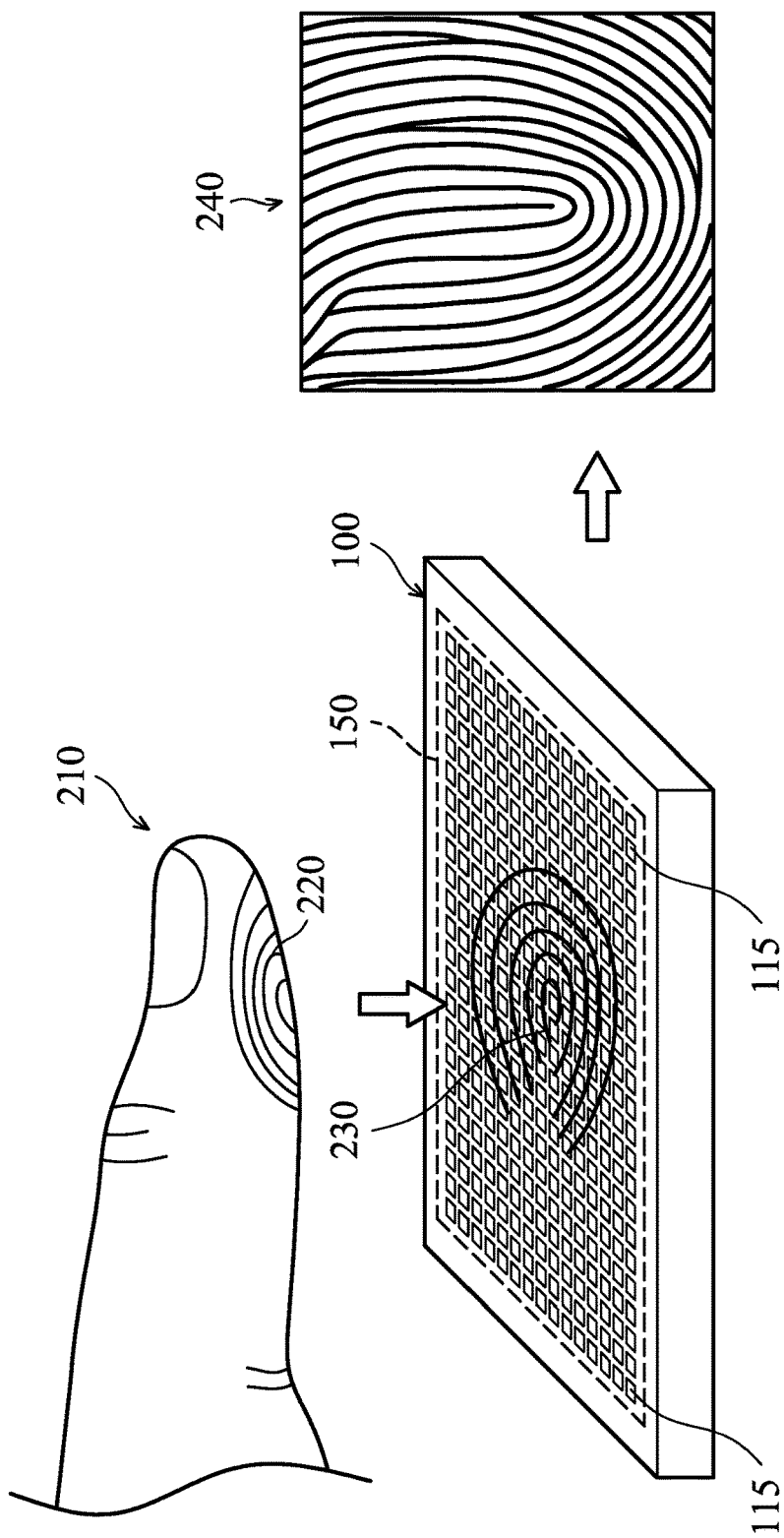
FIG. 2 shows a schematic diagram illustrating that the fingerprint sensor of FIG. 1 is used to obtain the fingerprint of the user.

FIG. 2 shows a schematic diagram illustrating that the fingerprint sensor 100 of FIG. 1 is used to obtain the fingerprint of the user. In FIG. 2, when the finger 210 contacts the fingerprint sensor 100, the fingerprint ridges 220 on the surface of the finger 210 will contact and press the sensing units 115 via the insulating surface 150. Thus, the fingerprint sensor 100 obtains a capacitance curve 230 corresponding to the fingerprint ridges 220, and identifies the shape of the fingerprint ridges 220 according to the shape of the capacitance curve 230, so as to obtain a fingerprint pattern 240. Next, the other circuits or devices can perform subsequent processes according to the fingerprint pattern 240.

Figure 3A:
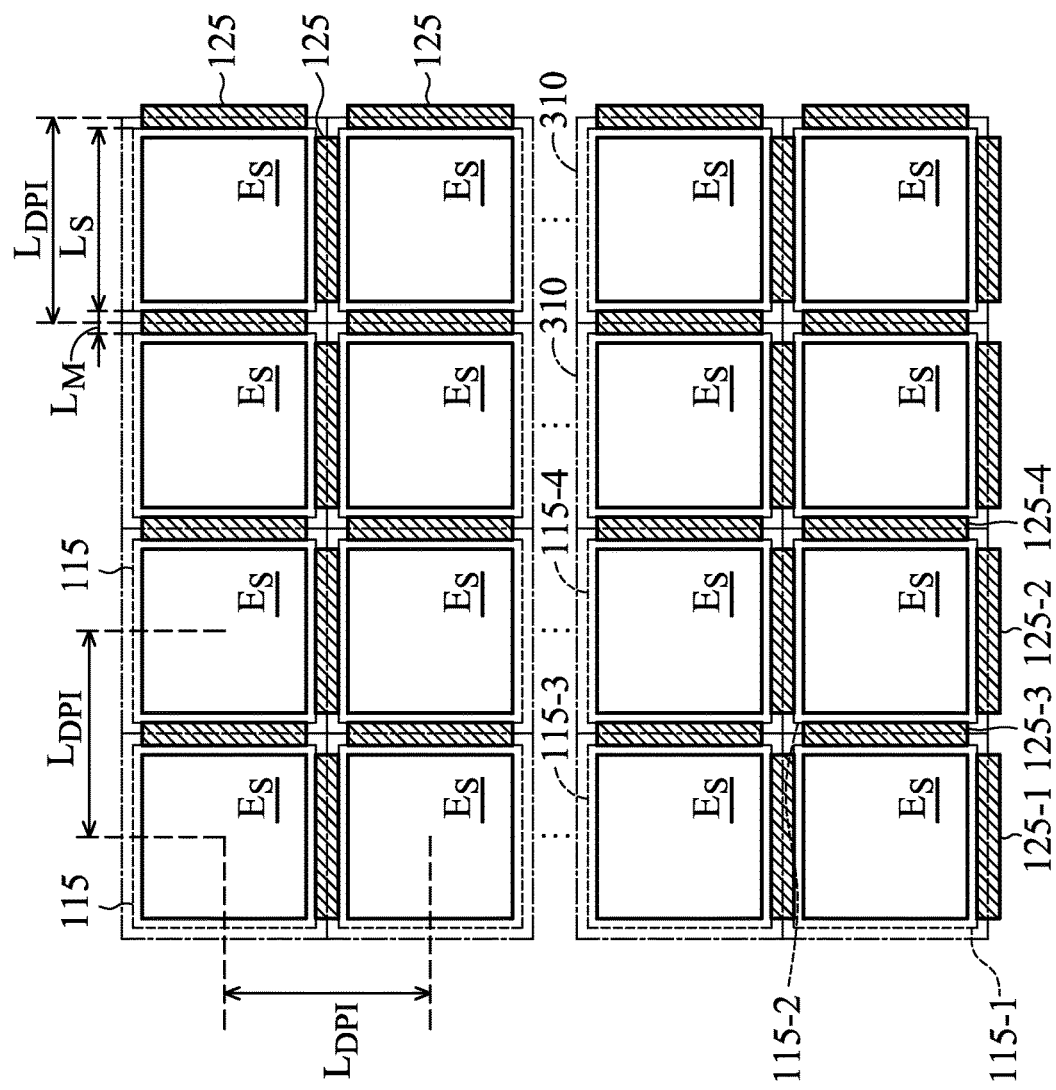
FIG. 3A shows a schematic diagram illustrating a layout arrangement of the sensing units and the memory units of FIG. 1 according to an embodiment of the invention.
Figure 3B:
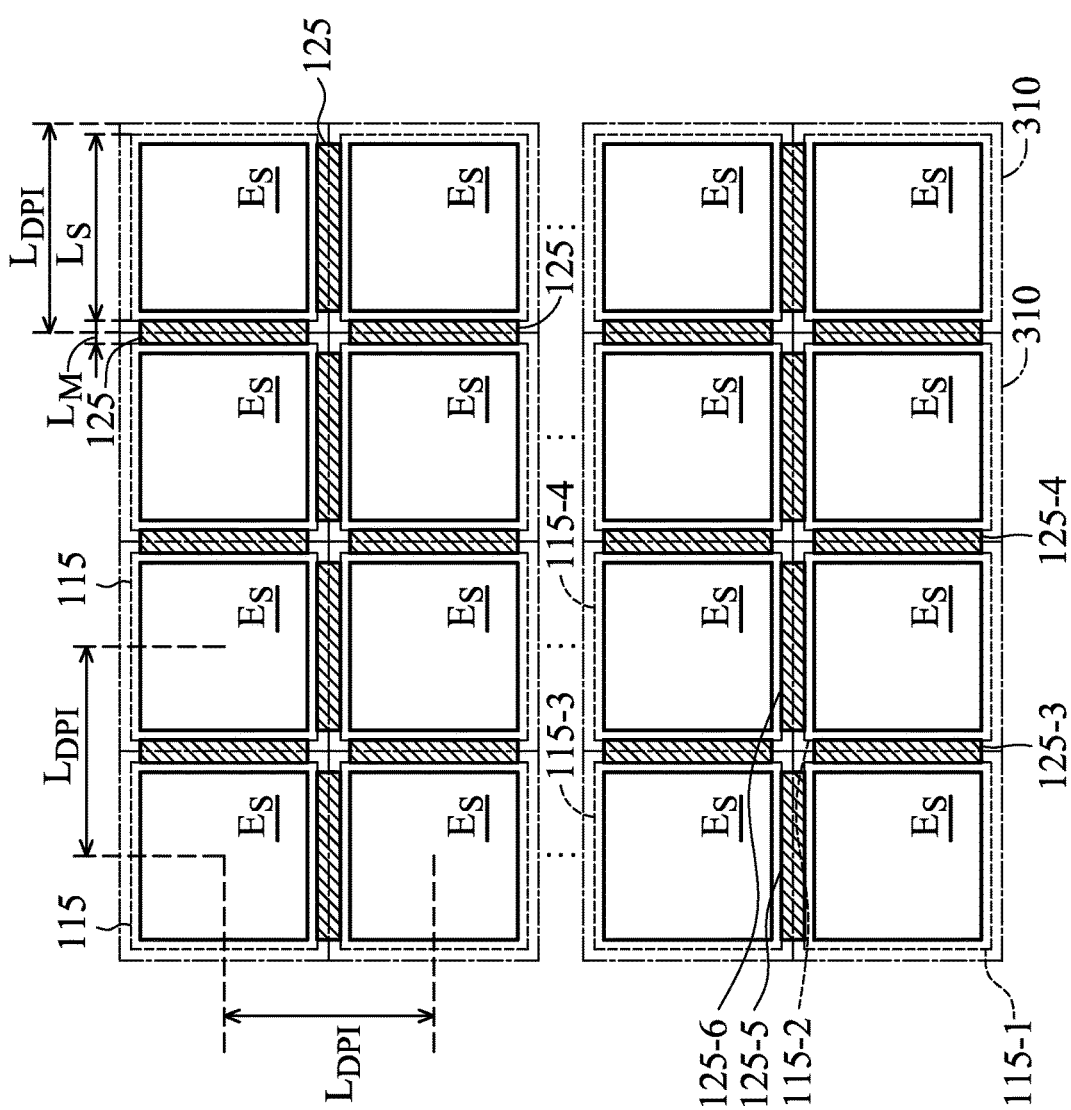
FIG. 3B shows a schematic diagram illustrating a layout arrangement of the sensing units and the memory units of FIG. 1 according to another embodiment of the invention.

FIG. 3A shows a schematic diagram illustrating a layout arrangement of the sensing units 115 and the memory units 125 of FIG. 1 according to an embodiment of the invention, and FIG. 3B shows a schematic diagram illustrating a layout arrangement of the sensing units 115 and the memory units 125 of FIG. 1 according to another embodiment of the invention. In FIGS. 3A and 3B, each sensing unit 115 is disposed in an individual sensing area 310. A minimum distance between the sensing electrodes $E_S$ of two adjacent sensing units 115 is $L_{DPI}$, wherein the minimum distance $L_{DPI}$ is determined by the resolution of the fingerprint sensor 100. Furthermore, the width of the sensing area 310 is $L_{DPI}$, the width of the sensing unit 115 is $L_S$, and the width of the memory unit 125 is $L_M$, wherein the minimum distance $L_{DPI}$ is determined by the widths of the sensing unit 115 and the memory unit 125, i.e. $L_{DPI}=L_S+L_M$. In one embodiment, $L_{DPI}$ may be 50 µm, $L_S$ may be 48 µm, and $L_M$ may be 2 µm. In FIG. 3A, the memory unit 125 is disposed on the right side and/or the lower side of the corresponding sensing unit 115. In another embodiment, the memory unit 125 is disposed on the left side and/or the upper side of the corresponding sensing unit 115. In FIG. 3B, each memory unit 125 is disposed in a space between the two adjacent sensing units 115, and the memory unit 125 does not overlap the sensing unit 115. Thus, by disposing the memory units 125 in the spaces between the sensing units 115, the memory capacity of the fingerprint sensor 100 is increased. Moreover, in one embodiment, in cases wherein the same memory capacity is maintained, the layout area of the fingerprint sensor 100 can be decreased by disposing the memory units 125 in the spaces among the sensing units 115. Detailed descriptions of FIG. 3A and FIG. 3B are provided below.

Figure 4:
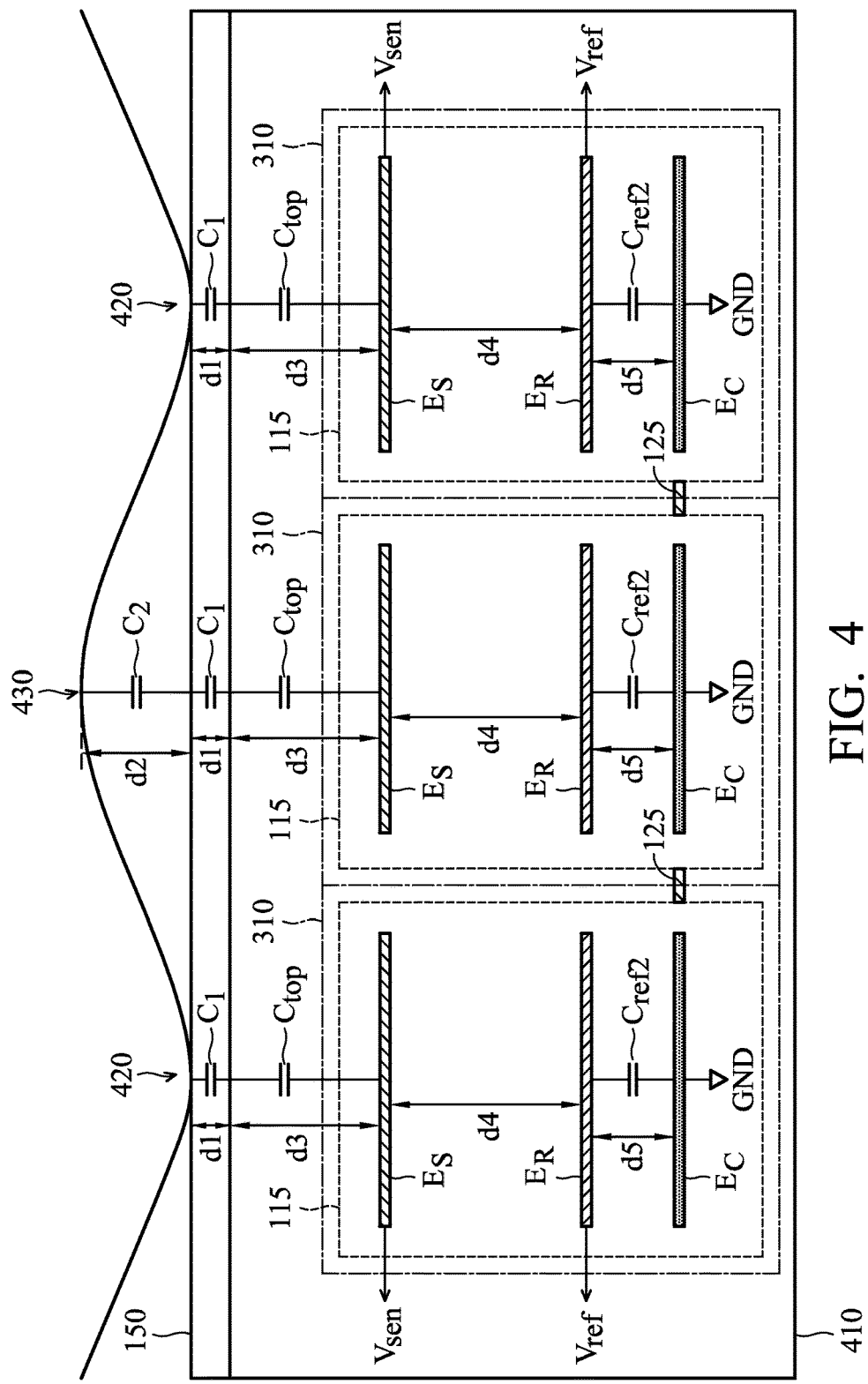
FIG. 4 shows a sectional schematic diagram illustrating the finger of the user contacting the fingerprint sensor of FIG. 1.

FIG. 4 shows a sectional schematic diagram illustrating the finger of the user contacting the fingerprint sensor 100 of FIG. 1. In FIG. 4, the insulating surface 150 is disposed on the semiconductor substrate 410. In general, the insulating surface 150 is a protective dielectric layer formed by performing the integrated circuit manufacturing process. The thickness of the insulating surface 150 is d1, wherein an equivalent capacitor $C_1$ of the insulating surface 150 is determined by the thickness d1. Label 420 represents a fingerprint ridge of the finger, wherein the fingerprint ridge 420 of the finger will directly contact the insulating surface 150. Moreover, Label 430 represents a fingerprint valley of the finger, wherein the distance between the fingerprint valley 430 of the finger and the insulating surface 150 is d2, and a capacitor $C_2$ between the fingerprint valley 430 and the insulating surface 150 is determined by the distance d2. In FIG. 4, the sensing array comprises a plurality of sensing units 115, wherein each sensing unit 115 comprises a sensing electrode $E_S$, a reference electrode $E_R$ and a common electrode $E_C$, and the reference electrode $E_R$ is disposed below the sensing electrode $E_S$. The sensing electrode $E_S$, the reference electrode $E_R$ and the common electrode $E_C$ are formed by different metal layers within the semiconductor substrate 410. The sensing electrode $E_S$ is formed by a top metal layer and is disposed below the insulating surface 150, and the thickness of an insulation layer between the insulating surface 150 and the sensing electrode $E_S$ is d3, wherein an equivalent capacitor $C_{top}$ in the insulation layer is determined according to the thickness d3. Therefore, when the fingerprint ridge 420 contacts the insulating surface 150, a sensing capacitor $C_{sen}$ between the fingerprint ridge 420 and the sensing electrode $E_S$ is formed by the capacitor $C_{top}$ and the capacitor $C_1$ connected in series. Therefore, when the finger contacts the insulating surface 150, the fingerprint ridge 420 and the fingerprint valley 430 will correspond to different capacitances. Thus, the readout module 130 of FIG. 1 can obtain the sensing voltage $V_{sen}$ corresponding to the sensing capacitor $C_{sen}$ via the sensing electrode $E_S$. When no object contacts the insulating surface 150, the readout module 130 also obtains the sensing voltage $V_{sen}$ via the sensing electrode $E_S$. When the insulating surface 150 is dirty or damaged, the sensing voltage $V_{sen}$ of the sensing unit disposed below the dirty or damaged region is different from the sensing voltages $V_{sen}$ of the other sensing units. Therefore, when no object contacts the insulating surface 150, the processor 140 will respectively set the sensing voltage $V_{sen}$ of each sensing unit as an error value or a factory preset value of the sensing unit, and store the sensing voltage $V_{sen}$ into the corresponding memory unit. For example, referring to FIG. 3A, a memory unit 125-1 is disposed on the lower side of a sensing unit 115-1, and a memory unit 125-2 is disposed on the lower side of a sensing unit 115-2, wherein an error value Err1 of the sensing unit 115-1 is stored in the corresponding memory unit 125-1, and an error value Err2 of the sensing unit 115-2 is stored in the corresponding memory unit 125-2. In one embodiment, a memory unit 125-3 is disposed on the right side of the sensing unit 115-1, and a memory unit 125-4 is disposed on the right side of the sensing unit 115-2, wherein the error value Err1 of the sensing unit 115-1 is stored in the corresponding memory unit 125-3, and the error value Err2 of the sensing unit 115-2 is stored in the corresponding memory unit 125-4. Thus, when the finger is placed on the sensing array 110, the processor 140 can generate the fingerprint information according to the current sensing voltages $V_{sen}$ sensed by the sensing units 115 and the error values stored in the corresponding memory units 125.

In FIG. 4, the thickness of an insulation layer between the reference electrode $E_R$ and the sensing electrode $E_S$ is d4. Furthermore, the common electrode $E_C$ is disposed below the reference electrode $E_R$, wherein the common electrode $E_C$ is coupled to a ground GND. The thickness of an insulation layer between the reference electrode $E_R$ and the common electrode $E_C$ is d5, and an equivalent capacitor $C_{ref2}$ in the insulation layer is determined according to the thickness d5. For each of the sensing units 115, the readout module 130 of FIG. 1 further obtains a reference voltage $V_{ref}$ corresponding to the reference capacitor $C_{ref2}$ via the reference electrode $E_R$. Thus, the processor 140 can obtain the fingerprint information according to the reference voltages $V_{ref}$, the sensing voltages $V_{sen}$ and the error values corresponding to the sensing units 115.

Furthermore, in another embodiment, the processor 140 generates a sensing output according to a difference value between the sensing voltages $V_{sen}$ of two adjacent sensing units. When no object contacts the insulating surface 150, the processor 140 stores the difference value between the sensing voltages $V_{sen}$ of each pair of two adjacent sensing units into the corresponding memory unit 125 as an error value of the two adjacent sensing units. Each pair of two adjacent sensing units corresponds to a memory unit 125, and the memory unit 125 is disposed between the corresponding two adjacent sensing units. When the user's finger contacts the insulating surface 150 and the sensing outputs corresponding to all pairs of two adjacent sensing units 115 are obtained, the processor 140 will generate the fingerprint information according to the sensing outputs and the error values stored in the memory units 125 corresponding to all pairs of two adjacent sensing units 115. In another embodiment, the processor 140 will store the fingerprint information corresponding to two adjacent sensing units 115 into the memory unit 125 corresponding to the two adjacent sensing units 115.

For example, referring to FIG. 3B, the memory unit 125-3 is disposed between the sensing units 115-1 and 115-2, and a difference ΔErr12 between the error value Err1 of the sensing unit 115-1 (i.e. the sensing voltage $V_{sen1}$ sensed by the sensing unit 115-1 when no object contacts the insulating surface 150) and the error value Err2 of the sensing unit 115-2 (i.e. the sensing voltage $V_{sen2}$ sensed by the sensing unit 115-2 when no object contacts the insulating surface 150) can be stored in the corresponding memory unit 125-3. Similarly, the memory unit 125-6 is disposed between the sensing units 115-2 and 115-4, wherein the difference ΔErr24 between the error value Err2 of the sensing unit 115-2 and the error value Err4 of the sensing unit 115-4 can be stored in the corresponding memory unit 125-6. Thus, the processor 140 can obtain the fingerprint information according to the reference voltages $V_{ref}$, the difference values corresponding to all pairs of two adjacent sensing units, and the differences ΔErr stored in the memory units corresponding to all pairs of two adjacent sensing units. Therefore, by inserting the memory units into the boundaries among the original sensing areas (e.g. the sensing area 310 in FIG. 3A and FIG. 3B), the memory capacity is increased and the chip area is used efficiently.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fingerprint sensor for sensing fingerprint information of a finger, comprising:
   a sensing array, comprising a plurality of sensing units, wherein each of the sensing units comprises a sensing electrode;
   a readout module, reading a sensing voltage of the sensing electrode of each of the sensing units and providing a sensing output according to the sensing voltage for each of the sensing units;
   a memory array, comprising a plurality of memory units, wherein each of the memory units only corresponds to one of the sensing units, is disposed adjacent to the corresponding sensing unit, and only stores information of the corresponding sensing unit; and
   a processor, obtaining the fingerprint information of the finger according to the sensing output and the stored information for each sensing unit and its corresponding memory unit.

2. The fingerprint sensor as claimed in claim 1, further comprising:
   a contact surface disposed on the sensing array, wherein when no object contacts the contact surface, the processor stores the sensing voltage of the sensing electrode of each of the sensing units into the corresponding memory unit as an error value of the sensing unit.

3. The fingerprint sensor as claimed in claim 2, wherein when an object contacts the contact surface and the sensing output corresponding to the sensing unit is obtained, the processor generates the fingerprint information of the finger according to the sensing outputs and the error values stored in the memory units corresponding to the sensing units.

4. The fingerprint sensor as claimed in claim 1, wherein the processor stores the fingerprint information of the finger sensed by each of the sensing units into the memory unit corresponding to the sensing unit.

5. A sensing method, comprising: in a fingerprint sensor comprising
a sensing array comprising a plurality of sensing units, and
a memory array comprising a plurality of memory units wherein each of the memory units only corresponds to one of the sensing units, is disposed adjacent to the corresponding sensing unit, and only stores information of the corresponding sensing unit,
reading a sensing voltage of a sensing electrode of each of the sensing units;
providing a sensing output according to the sensing voltage for each of the sensing units; and
obtaining fingerprint information of a finger according to the sensing output and the stored information for each sensing unit and its corresponding memory unit.

6. The sensing method as claimed in claim 5, further comprising: storing the sensing voltage of the sensing electrode of each of the sensing units into the corresponding memory unit as an error value of the sensing unit when no object contacts a contact surface of the fingerprint sensor, wherein the contact surface is disposed on the sensing array.

7. The sensing method as claimed in claim 6, wherein the step of obtaining the fingerprint information of the finger according to the sensing output and information stored in the memory unit further comprises: generating the fingerprint information of the finger according to the sensing outputs and the error values stored in the memory units corresponding to the sensing units when an object contacts the contact surface and the sensing outputs corresponding to the sensing units are obtained.

8. The sensing method as claimed in claim 5, further comprising: storing the fingerprint information of the finger sensed by each of the sensing units into the memory unit corresponding to the sensing unit.

9. A fingerprint sensor for sensing fingerprint information of a finger, comprising:
a sensing array, comprising a plurality of pairs of two adjacent sensing units, wherein each of the sensing units comprises a sensing electrode for generating a sensing voltage;
a readout module, obtaining a difference between the sensing voltages of each pair of two adjacent sensing units and providing a sensing output according to the difference between the sensing voltages of the two adjacent sensing units of said pair;
a memory array, comprising a plurality of memory units, wherein each of the memory units only corresponds to one of the pairs of two adjacent sensing units, is disposed between the two adjacent sensing units of said pair, and only stores information corresponding to the two adjacent sensing units of said pair; and
a processor, obtaining the fingerprint information of the finger according to the sensing output and the stored information for each pair of two adjacent sensing units and its corresponding memory unit.

10. The fingerprint sensor as claimed in claim 9, further comprising:
a contact surface disposed on the sensing array, wherein when no object contacts the contact surface, the processor stores the difference between the sensing voltages of the two adjacent sensing units into the corresponding memory unit as an error value of the two adjacent sensing units.

11. The fingerprint sensor as claimed in claim 10, wherein when an object contacts the contact surface and the difference between the sensing voltages of the two adjacent sensing units is obtained, the processor generates the fingerprint information of the finger according to the sensing output and the error value stored in the memory unit corresponding to the two adjacent sensing units.

12. The fingerprint sensor as claimed in claim 9, wherein the processor stores the fingerprint information of the finger corresponding to two adjacent sensing units into the memory unit corresponding to the two adjacent sensing units.

13. A sensing method, comprising: in a fingerprint sensor, wherein the fingerprint sensor comprises
a sensing array comprising a plurality of pairs of two adjacent sensing units, and
a memory array comprising a plurality of memory units, wherein each of the sensing units comprises a sensing electrode for generating a sensing voltage, and each of the memory units only corresponds to one of the pairs of two adjacent sensing units, is disposed between the two adjacent sensing units of said pair, and only stores information corresponding to the two adjacent sensing units of said pair,
obtaining a difference between the sensing voltages of each pair of two adjacent sensing units;
providing a sensing output according to the difference between the sensing voltages of each pair of two adjacent sensing units; and
obtaining fingerprint information of a finger according to the sensing output and the stored information for each pair of two adjacent sensing units and its corresponding memory unit.

14. The sensing method as claimed in claim 13, further comprising: storing the difference between the sensing voltages of the two adjacent sensing units into the corresponding memory unit as an error value corresponding to the two adjacent sensing units when no object contacts a contact surface of the fingerprint sensor, wherein the contact surface is disposed on the sensing array.

15. The sensing method as claimed in claim 14, wherein the step of obtaining the fingerprint information of the finger according to the sensing output and information stored in the memory unit further comprises: generating the fingerprint information of the finger according to the sensing output and the error value stored in the memory unit corresponding to the two adjacent sensing units when an object contacts the contact surface and the sensing output corresponding to the two adjacent sensing units is obtained.

16. The sensing method as claimed in claim 13, further comprising: storing the fingerprint information of the finger corresponding to the two adjacent sensing units into the memory unit corresponding to the two adjacent sensing units.

17. The fingerprint sensor as claimed in claim 1, wherein the plurality of memory units are interlaced among the plurality of sensing units.

18. The fingerprint sensor as claimed in claim 1, wherein each memory unit is disposed in a space between two adjacent sensing units.

19. The sensing method as claimed in claim 5, wherein the plurality of memory units are interlaced among the plurality of sensing units.

20. The sensing method as claimed in claim 5, wherein each memory unit is disposed in a space between two adjacent sensing units.

\* \* \* \* \*